Patented Sept. 16, 1952

2,610,968

UNITED STATES PATENT OFFICE 2,610,968

PRODUCTION OF ORGANO-THIYL COMPOUNDS

Morton Kleiman, Chicago, Ill., assignor to Velsicol Corporation, Chicago, Ill., a corporation of Illinois No Drawing. Application December 20, 1946, Serial No. 717,597

11 Claims. (Cl. 260—290)

This invention relates to organo-thiyl compounds, such as organic disulfides and mercaptans, and to a process for producing the same. More particularly, my invention relates to new classes of organic disulfides and new compositions of matter, as well as to methods whereby these and related known materials may be prepared.

One object of this invention is to provide a new process for preparing symmetrical and unsymmetrical organic disulfides. A symmetrical disulfide is herein defined as a compound of the general formula RSSR, wherein R represents any organic radical. An unsymmetrical organic disulfide is herein defined as a compound of the general formula RSSR', wherein R and R' represent two different organic radicals.

Another object of this invention is the preparation of organic disulfides hitherto unknown and/or believed to be impossible of existence.

Another object of this invention is to provide a new and simplified process for producing organic disulfides which have heretofore been prepared only with great difficulty by previously known methods.

Another object relates to the production and recovery of mercaptans.

Other objects and advantages will become apparent hereinafter.

Heretofore, only a few unsymmetrical organic disulfides have been synthesized. These have included a number of variously substituted diaryl disulfides and aryl alkyl disulfides. The methods involved in the preparation of these compounds have all been severely limited, painstaking, and costly, and therefore generally unsuited to industrial practice. Furthermore, owing to the extremely limited utility of these methods, it has never before been possible to synthesize most of the vast number of unsymmetrical disulfides theoretically capable of existence. Thus, no successful synthesis of any of the following types of unsymmetrical disulfides has heretofore been recorded:

1. Di-aliphatic and substituted di-aliphatic disulfides, such as, for example, methyl n-amyl disulfide, methyl beta-hydroxyethyl disulfide, or ethyl beta-chloroethyl disulfide.

2. Aliphatic alicyclic and substituted aliphatic alicyclic disulfides, such as, for example, ethyl cyclohexyl disulfide or ethyl 4-chlorocyclohexyl disulfide.

3. Substituted aliphatic aromatic disulfides, such as, for example, beta-hydroxyethyl phenyl disulfide, methyl 4-chlorophenyl disulfide, or isopropyl 3-nitrophenyl disulfide.

4. Aliphatic heterocyclic and substituted aliphatic heterocyclic disulfides, such as, for example, methyl 2-benzothiazyl disulfide, ethyl 2-thienyl disulfide, or methyl 2-pyridyl disulfide.

5. Di-alicyclic and substituted di-alicyclic disulfides, such as, for example, cyclopropyl cyclohexyl disulfide, or 4-bromocyclohexyl disulfide.

6. Alicyclic aromatic and substituted alicyclic aromatic disulfides, such as, for example, cyclohexyl naphthyl disulfide, cyclopentyl phenyl disulfide, or cyclopentyl 2-chlorophenyl disulfide.

7. Alicyclic heterocyclic and substituted alicyclic heterocyclic disulfides, such as, for example, cyclohexyl 4-pyridyl disulfide or cyclopentyl 2-benzothiazyl disulfide.

8. Aromatic heterocyclic and substituted aromatic heterocyclic disulfides, such as, for example, phenyl 2-thienyl disulfide or 4-nitrophenyl 2-pyrryl disulfide.

9. Di-heterocyclic and substituted di-heterocyclic disulfides, such as, for example, 4-pyridyl 2-benzothiazyl disulfide, or 4-(2-chloropyridyl) 2-benzothiazyl disulfide.

Compounds belonging to any of the above classes may now be prepared simply, and in good yield by the process embodied in the present invention.

Broadly stated, my invention comprises providing an appropriate reaction mixture in which all the groups desired are present (but obviously not in the same combination as that of the finally desired compound or compounds) and effecting the redistribution of these groups by appropriate means, as described hereinafter.

Thus, in one specific embodiment, my invention relates to a method of synthesizing organic disulfides by effecting a redistribution of organo-thiyl groups, as described hereinafter, within a reaction mixture of organic disulfides wherein the organo-thiyl groups of the reactants are in combination different from that of the desired reaction product. The reaction mixture may be composed of different symmetrical organic disulfides, different unsymmetrical organic disulfides, or a mixture of symmetrical and unsymmetrical organic disulfides. For example, an unsymmetrical organic disulfide may be synthesized by subjecting to appropriate redistribution conditions a reaction mixture comprising two symmetrical organic disulfides.

In another specific embodiment, my invention relates to a method of synthesizing organic disulfides, either symmetrical of unsymmetrical, by effecting a redistribution of organo-thiyl groups, as described hereinafter, within a reaction mixture of an organic disulfide and a mercaptan wherein the organo-thiyl groups of the reactants are in combination different from that of the desired reaction product. The organic disulfide of the reaction mixture may be unsymmetrical or symmetrical. In the latter case the RS-group of the mercaptan should be different from those present in the symmetrical organic disulfide. In this embodiment mercaptans may be recovered as a product or by-product of the process.

In still another specific embodiment, my invention relates to the synthesis of symmetrical organic disulfides by effecting, as described hereinafter, a redistribution of the organo-thiyl groups of unsymmetrical organic disulfides.

The following are illustrative of some of the reactions which occur:

1. $RSSR + R'SSR' \rightleftarrows 2RSSR'$
2. $RSSR + R'SH \rightleftarrows RSSR' + RSH$
3. $RSSR + 2R'SH \rightleftarrows R'SSR' + 2RSH$ Thus, in accordance with Equation 1, any particular unsymmetrical disulfide, RSSR', may be obtained by appropriate treatment as described hereinafter, of a mixture of the two symmetrical disulfides, RSSR, and R'SSR'. Conversely, unsymmetrical disulfides may be similarly converted and by subsequent suitable fractionation or other ordinary purification procedure separated into each of the symmetrical disulfides corresponding to the various RS-groups originally present.

In accordance with Equation 2, any particular unsymmetrical disulfide, RSSR', may be obtained by analogous treatment of an approximately equimolar mixture of a symmetrical disulfide, RSSR, and a mercaptan, R'SH.

In accordance with Equation 3, a symmetrical disulfide, R'SSR', may be obtained by reacting two or more mols of its corresponding thiol compound, R'SH, with approximately one mol of a different, symmetrical disulfide, RSSR. It is obvious that this same reaction may be utilized as well for producing mercaptans. A special case of this reaction is the catalyzed reduction of a disulfide by hydrogen sulfide; this reagent may be regarded as a mercaptan, reacting in accordance with the same general scheme, as follows:

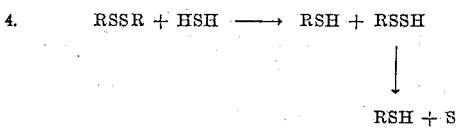

The end result being:

5.     $RSSR + H_2S \rightarrow 2RSH + S$

For carrying out the redistribution reactions described above in accordance with the present invention, certain catalytic agents are employed, which comprise organic peroxides, such as benzoyl peroxide, lauryl peroxide, acetyl peroxide, and other free radical progenitors under the conditions of the reaction, such as phenyl disulfide, bis-(thio-alpha-naphthoyl) disulfide, acetyl disulfide, pentaphenyl ethane, bixanthyl and some of its derivatives, and others.

The use of organic peroxides and of other free radical progenitors, such as those mentioned above, as catalysts for these reactions is predicated upon their ability to produce free radicals which can initiate a chain reaction of the following type:

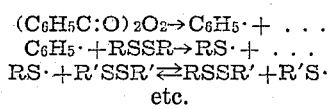

These catalyzed reactions are performed in nonaqueous, liquid systems at temperatures from about 50° C. to about 225° C. for a period of from about one to about twenty-four hours.

These limits of temperature and time are not critical, but represent rather, the optimum working range. Thus, at temperatures much below 50° C., these reactions become very slow and require an unduly extended reaction period, while at temperatures much above 225° C., the advantages of greater reaction velocities are offset by the disadvantage of causing some decomposition of the reactants. In some instances, it may also be necessary when using higher temperatures, to provide sufficient pressure to confine the reactants to the reaction vessel and to retain them in the liquid state.

In most instances, the mixture of reactants is simply heated for about one hour (or even less, such as about one-half hour, but with lower yields) at a temperature of approximately 100° C.–150° C., with a catalyst. The separation of the reaction product is then effected by usual methods, such as fractional distillation, crystallization, etc.

There are many important uses in industry and the arts for organic disulfides and mercaptans prepared in accordance with my invention, including both those previously known but which may now be prepared more simply and cheaply by the processes of my invention, and those which have not previously been known and which may now be prepared for the first time by the methods herein disclosed. Especially prominent among the many industrial applications of these known compounds is their utilization as modifiers, stabilizers, accelerators, anti-oxidants and vulcanizing agents in the manufacture of synthetic and natural rubber products. Among the large number of such compounds which are useful for these applications, the following may be mentioned as typical: Alpha- and beta-naphthyl mercaptans, o- and p-mercaptobiphenyls, diisopropyl dixanthogen, tolyl disulfide, alkyl phenol disulfides, 2-methylbutyl disulfide, 3-methylpentyl disulfide, 2-ethylhexyl disulfide, 2-mercaptobenzothiazole, 2-mercaptobenzoxazole, 2-mercapto-4-alkyl or aryl-thiazole, thioglycolic acid, thiolactic acid, beta-mercaptoethanol, dithiodiglycolic acid, bis-(beta-hydroxyethyl) disulfide, and bis-(beta-aminoethyl) disulfide.

Organic disulfides such as butyl disulfide, whose preparation from butyl mercaptan is described in Example I, are excellent solvents for rubber, resins, and plastics, and their use enables the utilization of a wide variety of special formulations of coating compositions which exploit the unique plasticizing properties of these materials—especially of rubber.

Many mercaptans and disulfides, previously known, but which may now be prepared more simply and economically by the processes of my invention, are chemical intermediates for the synthesis of sulfonic acids and sulfonium compounds which find extensive applications as wetting agents, detergents emulsifiers and demulsifiers. Certain mercaptans, such as ethyl mercaptan, butyl mercaptan, and amyl mercaptan, and disulfides, such as furfuryl disulfide, are of considerable importance as odorants, the former as warning agents in gases and the latter as ingredients in perfumes. In the manufacture of particular types of glues and adhesives, certain vegetable proteins and albumenoids, such as soybean flour, linseed protein, etc., are treated with organic disulfides, such as methyl disulfide and butyl disulfide. Allyl disulfide and 2-methyl-allyl disulfide are valuable additives for imparting greater stability to films against the action of heat and ultra-violet light. The xanthates and dixanthogens are well known and have long been used as flotation agents. Other disulfides, such as dihexamethylenethiuram disulfide, dimorpholinethiuram disulfide, diphenyl disulfide, bis-(4-chlorophenyl) disulfide and beta-naphthyl disulfide are of use as fungicides and insecticides. A number of disulfides, such as methyl disulfide and ethyl disulfide, are also used as additives in lubricating oils for improving the film strength and tenacity under high pressure, and as stabilizing agents in viscous, highly refined mineral oils, such as transformer oils.

In the category of organic disulfides which have hitherto been unknown and impossible to prepare by known methods but which may now be made according to the principles herein disclosed, are many compounds which I have found to possess properties valuable in industry and the arts. These compounds are useful in many of the applications enumerated above; in addition, particular compounds possess uniquely valuable characteristics.

Thus, for example, the new compound, methyl n-butyl disulfide, described in Example II, combines the advantages of both the methylthiyl and the butylthiyl groups in one molecule, and will thus be found of greater value than either of the parent compounds in the manufacture of glue and adhesives. Methyl octyl disulfide, described in Example III, will be found useful as an odorant, fixative, and co-solvent in perfumes. It is also an excellent solvent for rubber, resins and plastics, and therefore of value in special coating composition formulations. Ethyl 2-benzothiazyl disulfide, described in Example IV, will be found useful as a rubber chemical of the type previously described.

From the foregoing discussion and examples it is evident that my invention provides not only simply and inexpensive processes for preparing a large number of known mercaptans and disulfides but also makes possible the synthesis of hitherto unknown disulfides, the composition of which can be "tailored" to provide unique and specially desired characteristics.

Typical practice of this invention, its simplicity, and wide utility will be illustrated by the following specific examples, which are not intended to limit the invention in any respect:

Example I

Reaction of a symmetrical organic disulfide with an excess of a mercaptan, in the presence of benzoyl peroxide as catalyst, to form a different disulfide and mercaptan:

Methyl disulfide and n-butyl mercaptan were reacted to give n-butyl disulfide and methyl mercaptan as follows: Methyl disulfide (4.7 ml., 0.05 mol), n-butyl mercaptan (21 ml., 0.2 mol) and benzoyl peroxide (ca. 150 mg.) were placed in a 50 ml. flask connected by a ground glass joint to a reflux condenser, the outlet of which was connected to a trap cooled at −80° C. The mixture was heated at 125° C. for three hours. The excess n-butyl mercaptan was then distilled off at atmospheric pressure (B. P. 96° C.–100° C.), retaining the cold trap at the end of the system to condense the last traces of methyl mercaptan which might come over. Upon distillation of the rest of the reaction mixture under reduced pressure, n-butyl disulfide, $b_{20}$ 116°–118° C., was obtained among the reaction products.

Example II

Reaction of two symmetrical organic disulfides, in the presence of benzoyl peroxide as catalyst, to produce a new, unsymmetrical disulfide:

Methyl disulfide and n-butyl disulfide were reacted to form methyl n-butyl disulfide as follows: Methyl disulfide (10.0 ml.), n-butyl disulfide (10.0 ml.), and benzoyl peroxide (ca. 50 mg.) were heated together at 90° C. for one hour. The resulting mixture, upon fractional distillation under 20 mm. of mercury pressure gave recovered starting materials and methyl n-butyl disulfide, $b_{22}$ 77.5°–78.5° C., weighing 4.5 g.

Example III

Reaction of two symmetrical organic disulfides, in the presence of benzoyl peroxide as catalyst, to produce a new, unsymmetrical disulfide:

n-Octyl disulfide and methyl disulfide were reacted to give methyl n-octyl disulfide as follows: Methyl disulfide (13.5 ml., 0.15 mol), n-octyl disulfide (16.1 ml., 0.05 mol), and benzoyl peroxide (ca. 75 mg. added in two portions, one at the start, and the other in the middle of the reaction period) were heated at gentle reflux over a small flame for two hours. The resulting mixture, upon fractional distillation under reduced pressure, gave recovered starting materials and clear, water-white methyl n-octyl disulfide, $b_{0.3}$ 65–68° C.

Example IV

Reaction of two symmetrical organic disulfides, in the presence of lauryl peroxide as catalyst, to produce a new, unsymmetrical disulfide:

Ethyl disulfide and 2-benzothiazyl disulfide were reacted to give ethyl 2-benzothiazyl disulfide as follows: Ethyl disulfide (36.6 g., 0.3 mol), 2-benzothiazyl disulfide (13.3 g., 0.04 mol), and lauryl peroxide (ca. 1 g., added in several portions over the reaction period) were heated together at 150° C. for 4 hours. After cooling, the excess ethyl disulfide was distilled off at 20 mm. pressure. The crude product was then distilled twice, giving ethyl 2-benzothiazyl disulfide, $b_{0.005}$ 115°–117° C.

Example V

Reaction of two symmetrical organic disulfides, in the presence of benzoyl peroxide as catalyst, to produce a new, unsymmetrical disulfide:

Methyl disulfide and diisopropyl dixanthogen were reacted to give methyl isopropoxythioformyl disulfide as follows: Methyl disulfide (250 g.), diisopropyl dixanthogen (20.3 g., 0.075 mol), and benzoyl peroxide (ca. 0.3 g., added in several portions during the reaction period) were heated at 140° C. for 4 hours, then cooled. After removal of the excess methyl disulfide at reduced pressure, the crude product was fractionally distilled in vacuo, giving methyl isopropoxythioformyl disulfide, $b_{0.2}$ 50° C.

Example VI

Reaction of two symmetrical organic disulfides, in the presence of lauryl peroxide as catalyst, to produce a new, unsymmetrical disulfide:

Methyl disulfide and ethyl disulfide were reacted to give methyl ethyl disulfide as follows: Ten ml. each of methyl disulfide and ethyl disulfide were heated together for 2 hours at 100° C., adding ca. 250 mg. of lauryl peroxide in several portions during the reaction period. Fractionation of the mixture at reduced pressure gave recovered starting materials and methyl ethyl disulfide, $b_{105}$ 75.5–76° C.

*Example VII*

Reaction of two symmetrical organic disulfides, in the presence of benzoyl peroxide as catalyst, to produce a new, unsymmetrical disulfide:

Methyl disulfide and isoamyl disulfide were reacted to give methyl isoamyl disulfide as follows: Methyl disulfide (13.5 ml., 0.15 mol), isoamyl disulfide (16.8 ml., 0.075 mol) and benzoyl peroxide (ca. 50 mg.) were heated at 100° C. for 1¼ hours, then fractionated at reduced pressure. The product, methyl isoamyl disulfide, $b_{22}$ 85–86° C., was obtained as an almost colorless liquid. A portion of the starting materials was also recovered.

*Example VIII*

Reaction of an unsymmetrical organic disulfide, in the presence of phenyl disulfide as catalyst, to produce two symmetrical organic disulfides:

Ethyl n-amyl disulfide was broken down into ethyl disulfide and n-amyl disulfide as follows: Ethyl n-amyl disulfide was heated for 4 hours at 160° C., adding ca. 250 mg. of phenyl disulfide in three portions during the reaction period. Reduced pressure fractionation of the resulting mixture gave ethyl disulfide, n-amyl disulfide, and recovered ethyl n-amyl disulfide as the main products of the reaction.

Other examples of various reactants, catalysts, processes, and reaction products, are as follows:

*Example IX*

Ethyl n-butyl disulfide, an unsymmetrical, di-aliphatic disulfide, may be prepared from n-butyl mercaptan and ethyl disulfide in a 1:1 molar ratio, by reacting these materials under conditions similar to those already described, in the presence of a small amount of benzoyl peroxide as catalyst. Ethyl mercaptan is recovered as a by-product of this reaction.

*Example X*

Ethyl 2-chloroethyl disulfide, an unsymmetrical, substituted, di-aliphatic disulfide, may be prepared from a mixture of the two symmetrical disulfides, ethyl disulfide, and bis-(2-chloroethyl) disulfide, under the conditions already outlined, in the presence of a small amount of phenyl disulfide as catalyst.

*Example XI*

Ethyl allyl disulfide, an unsymmetrical, di-aliphatic disulfide may be prepared similarly by reacting ethyl disulfide and allyl mercaptan in a 1:1 molar ratio, in the presence of a small quantity of lauryl peroxide as catalyst. Ethyl mercaptan is recovered as a by-product of this reaction.

*Example XII*

Isopropyl cyclopentyl disulfide, an unsymmetrical, aliphatic alicyclic disulfide, may be prepared from a mixture of the two symmetrical compounds, isopropyl disulfide and cyclopentyl disulfide, under the conditions outlined above, in the presence of a small amount of bis-(thio-alpha-naphthoyl) disulfide as catalyst.

*Example XIII*

Ethyl cyclohexyl disulfide, an unsymmetrical, aliphatic alicyclic disulfide, may be prepared from ethyl disulfide and cyclohexyl mercaptan in a 1:1 molar ratio, in the manner already described, by the use of a small quantity of lauryl peroxide as the catalyst. Ethyl mercaptan is recovered as a by-product of this reaction.

*Example XIV*

Allyl 4-chlorocyclohexyl disulfide, an unsymmetrical, substituted, aliphatic alicyclic disulfide, may be prepared from a mixture of the two symmetrical compounds, allyl disulfide and 4-chlorocyclohexyl disulfide, in the presence of a small amount of bixanthyl as catalyst.

*Example XV*

2-hydroxyethyl phenyl disulfide, a substituted, unsymmetrical, aliphatic aromatic disulfide, may be prepared from a mixture of the two symmetrical disulfides, bis-(2-hydroxyethyl) disulfide, and phenyl disulfide, in the manner already described, by using a small amount of benzoyl peroxide as catalyst.

*Example XVI*

2-chloropropyl alpha-naphthyl disulfide, a substituted, unsymmetrical, aliphatic aromatic disulfide, may be prepared from a mixture of the two symmetrical disulfides, bis-(2-chloropropyl) disulfide and bis-(alpha-naphthyl) disulfide, under the usual reaction conditions, by the use of a small amount of bis-(thio-alpha-naphthoyl) disulfide as catalyst.

*Example XVII*

Methyl 4-chlorophenyl disulfide, an unsymmetrical, substituted, aliphatic aromatic disulfide, may be prepared from a mixture of methyl disulfide and 4-chlorothiophenol in a 1:1 molar ratio, in the manner already described in detail above, by the use of a small quantity of lauryl peroxide as catalyst. Methyl mercaptan is recovered as a by-product of this reaction.

*Example XVIII*

Ethyl 2-thienyl disulfide, an unsymmetrical, aliphatic heterocyclic disulfide, may be prepared from ethyl disulfide and 2-mercaptothiophene in a 1:1 molar ratio, under the conditions of reaction usually employed, by the use of a small quantity of phenyl disulfide as catalyst. Ethyl mercaptan is recovered as a by-product of this reaction.

*Example XIX*

Methyl 2-pyridyl disulfide, an unsymmetrical, aliphatic heterocyclic disulfide, may be prepared from methyl disulfide and 2-mercaptopyridine by reacting these two materials in a 1:1 molar ratio, in the presence of a small amount of lauryl peroxide as catalyst. Methyl mercaptan is recovered as a by-product of this reaction.

*Example XX*

Allyl 4-(2-chloropyridyl) disulfide, an unsymmetrical, substituted, aliphatic heterocyclic disulfide, may be prepared in the usual manner from a mixture of the two symmetrical disulfides, allyl disulfide, and bis-[4-(2-chloropyridyl)] disulfide, in the presence of acetyl peroxide as catalyst.

Example XXI

Cyclopentyl cyclohexyl disulfide, an unsymmetrical, di-alicyclic disulfide, may be prepared in the manner already described from a mixture of the two symmetrical compounds, cyclopentyl disulfide and cyclohexyl disulfide, by reacting these in the presence of a catalyst comprising a small amount of p-toluoyl peroxide.

Example XXII 3-chlorocyclohexyl cyclohexyl disulfide, a substituted, unsymmetrical di-alicyclic disulfide, may be prepared from a mixture of the two symmetrical compounds bis-(3-chlorocyclohexyl) disulfide and cyclohexyl disulfide by interacting the two in the usual manner in the presence of phenyl disulfide as catalyst.

Example XXIII

Cyclopentyl cyclohexyl disulfide, an unsymmetrical, di-alicyclic disulfide may be prepared from cyclopentyl disulfide and cyclohexyl mercaptan in a 1:1 molar ratio by interacting the two in the presence of a small amount of lauryl peroxide as catalyst. Cyclopentyl mercaptan is recovered as a by-product in this reaction.

Example XXIV

Cyclohexyl phenyl disulfide, an unsymmetrical, alicyclic aromatic disulfide, may be prepared in the usual manner from a mixture of the two symmetrical compounds, cyclohexyl disulfide and phenyl disulfide, by interacting these in the presence of a small quantity of bis-(thio-alpha-naphthoyl) disulfide.

Example XXV

Cyclohexyl beta-naphthyl disulfide, an unsymmetrical, alicyclic aromatic disulfide, may be prepared by interacting the two symmetrical compounds, cyclohexyl disulfide and beta-naphthyl disulfide, in the presence of a catalyst comprising beta-naphthyl disulfide.

Example XXVI

Cyclopentyl 2-chlorophenyl disulfide, an unsymmetrical, substituted, alicyclic aromatic disulfide, may be prepared by interacting cyclopentyl disulfide and 2-chlorothiophenol in a 1:1 molar ratio in the presence of a small quantity of benzoyl peroxide as catalyst. Cyclopentyl mercaptan is recovered as a by-product of this reaction.

Example XXVII

Cyclohexyl 4-pyridyl disulfide, an unsymmetrical, alicyclic heterocyclic disulfide, may be prepared in the usual manner from a mixture of the two symmetrical disulfides, cyclohexyl disulfide and bis-(4-pyridyl) disulfide by interacting these materials in the presence of a small amount of bixanthyl as catalyst.

Example XXVIII

Cyclopentyl 2-benzothiazyl disulfide, an unsymmetrical, alicyclic heterocyclic disulfide, may be prepared from an equimolar mixture of cyclopentyl disulfide and 2-mercaptobenzothiazol in the presence of benzoyl peroxide as catalyst. Cyclopentyl mercaptan may be recovered as a by-product of this reaction.

Example XXIX 4-chlorocyclohexyl 2-thienyl disulfide, a substituted, unsymmetrical, alicyclic heterocyclic disulfide, may be prepared from a mixture of the two symmetrical compounds, bis-(4-chlorocyclohexyl) disulfide and bis-(2-thienyl) disulfide by interacting these materials in the presence of lauryl peroxide as catalyst.

Example XXX

Phenyl 2-thienyl disulfide, an unsymmetrical, aromatic heterocyclic disulfide, may be prepared by interacting in a 1:1 molar ratio, bis-(2-thienyl) disulfide and thiophenol in the presence of bis-(thio-alpha-naphthoyl) disulfide as catalyst. 2-mercaptothiophene is recovered as a by-product of this reaction.

Example XXXI

Phenyl 4-pyridyl disulfide, an unsymmetrical, aromatic heterocyclic disulfide, may be prepared from a mixture of the two symmetrical compounds, phenyl disulfide and bis-(4-pyridyl) disulfide, by interacting these two materials under the usual reaction conditions in the presence of pentaphenyl ethane as catalyst.

Example XXXII 4-nitrophenyl 2-thienyl disulfide, a substituted, unsymmetrical, aromatic heterocyclic disulfide, may be prepared by interacting the two symmetrical compounds, bis-(4-nitrophenyl) disulfide and bis-(2-thienyl) disulfide, under the usual reaction conditions in the presence of acetyl peroxide as catalyst.

Example XXXIII 2-thienyl 4-pyridyl disulfide, an unsymmetrical, di-heterocyclic disulfide, may be prepared from a 1:1 molar mixture of bis-(2-thienyl) disulfide and 4-mercaptopyridine by interacting these two materials in the presence of benzoyl peroxide as catalyst. 2-mercaptothiophene is recovered as a by-product of this reaction.

Example XXXIV 4-pyridyl 4-(2-chloropyridyl) disulfide, a substituted, unsymmetrical, di-heterocyclic disulfide, may be prepared by reacting under the usual conditions, a mixture of the two symmetrical compounds, bis-(4-pyridyl) disulfide and bis-[4-(2-chloropyridyl)] disulfide, in the presence of a small amount of phenyl disulfide as catalyst.

Example XXXV 2-thienyl 2-benzothiazyl disulfide, an unsymmetrical, di-heterocycle disulfide, may likewise be prepared from a mixture of the two symmetrical materials, bis-(2-thienyl) disulfide and bis-(2-benzothiazyl) disulfide by interacting these two materials under the usual reaction conditions, in the presence of a catalyst comprising beta-naphthyl disulfide.

Other examples of the preparation of symmetrical disulfides by interaction of two mols of a mercaptan with one mol of a symmetrical disulfide are as follows:

Example XXXVI

Phenyl disulfide, a symmetrical, aromatic disulfides may be prepared by reacting under the usual conditions a mixture of two or more mols of thiophenol and one mol of isopropyl disulfide in the presence of benzoyl peroxide as catalyst. Isopropyl mercaptan is recovered as a by-product of this reaction.

Example XXXVII

Beta-naphthyl disulfide, a symmetrical, aromatic disulfide, is prepared from beta-mercaptonaphthalene when two or more mols of this compound are interacted with one mol of ethyl disulfide in the presence of a catalytic quantity of lauryl peroxide. Ethyl mercaptan is recovered as a by-product in this reaction.

Example XXXVIII

Bis-(4-pyridyl) disulfide, a symmetrical, diheterocyclic disulfide, may likewise be prepared by interacting two or more mols of 4-mercaptopyridine with one mol of methyl disulfide in the presence of a catalytic quantity of bis-(thio-alpha-naphthoyl) disulfide. Methyl mercaptan is recovered as a by-product in this reaction.

Other examples of the formation of symmetrical disulfides by reaction of an unsymmetrical organic disulfide with any of the above catalytic materials are as follows:

Example XXXIX

The unsymmetrical, substituted, aliphatic aromatic disulfide, 2-hydroxyethyl phenyl disulfide, gives the symmetrical compounds bis-(2-hydroxyethyl) disulfide, and phenyl disulfide, when it is treated with a small amount of phenyl disulfide as catalyst, under the reaction conditions already described.

Example XL

The unsymmetrical, di-aliphatic disulfide, ethyl allyl disulfide, gives the two symmetrical compounds, ethyl disulfide and allyl disulfide, by treating it with a catalyst comprising bis-(thio-alpha-naphthoyl) disulfide under the usual reaction conditions.

Example XLI

The unsymmetrical, aliphatic alicyclic disulfide, isopropyl cyclopentyl disulfide, likewise gives the two symmetrical compounds, isopropyl disulfide and cyclopentyl disulfide, by treating it with a catalyst comprising acetyl disulfide, under the usual conditions of reaction.

Any of the numerous, unsymmetrical disulfides mentioned above will react in a similar manner under similar reaction conditions to furnish an equilibrium mixture of the two symmetrical disulfides which correspond to the organo-thiyl groups of the unsymmetrical disulfide.

The above description and examples are for illustration only and are not intended to limit the scope of the invention. Any departure therefrom which conforms to the spirit of the invention and comes within the scope of the appended claims is to be regarded as an embodiment of this invention.

I claim as my invention:

1. The method of synthesizing organic disulfides which comprises subjecting at a temperature of from about 50° C. to about 225° C., reactants containing different organo-thiyl groups selected from the group consisting of (a) a mixture of organic disulfides, (b) a mixture of an organic disulfide and a mercaptan, and (c) an unsymmetrical organic disulfide—the organo-thiyl groups of said reactants being in combination different from that of the reaction products—to a redistribution of their organo-thiyl groups by reacting said reactants in the presence of a catalyst chosen from the group consisting of an organic peroxide phenyl disulfides bis-(thiyl-alpha-naphthoyl) disulfide, acetyl disulfide, pentaphenyl ethane and bixanthyl in the amount of from about .05 to about 6 mol per cent based on a reactant.

2. The method of synthesizing organic disulfides which comprises subjecting, at a temperature of from about 50° C. to about 225° C., reactants containing different organo-thiyl groups selected from the group consisting of (a) a mixture of organic disulfides, (b) a mixture of an organic disulfide and a mercaptan, and (c) an unsymmetrical organic disulfide—the organo-thiyl groups of said reactants being in combination different from that of the reaction products—to a redistribution of their organo-thiyl groups by reacting said reactants in the presence of an organic peroxide in the amount of from about .05 to about 6 mol per cent based on a reactant.

3. The method of synthesizing an unsymmetrical organic disulfide which comprises effecting the redistribution of the organo-thiyl groups within a mixture of organic disulfides—the organo-thiyl groups of said reactants being in combination different from that of the reaction products—by reacting said mixture at a temperature of from about 50° C. to about 225° C., in the presence of a catalyst chosen from the group consisting of an organic peroxide phenyl disulfides bis-(thiyl-alpha-naphthoyl) disulfide, acetyl disulfide, pentaphenyl ethane and bixanthyl in the amount of from about .05 to about 6 mol per cent based on a reactant.

4. The method of synthesizing an unsymmetrical organic disulfide, RSSR', which comprises effecting the redistribution of the organo-thiyl groups within a mixture of two symmetrical organic disulfides, RSSR, and R'SSR', wherein R and R' represent two different organic radicals, by reacting said mixture at a temperature of from about 50° C. to about 225° C., in the presence of a catalyst chosen from the group consisting of an organic peroxide phenyl disulfides bis-(thiyl-alpha-naphthoyl) disulfide, acetyl disulfide, pentaphenyl ethane and bixanthyl in the amount of from about .05 to about 6 mol per cent based on a reactant.

5. The method of synthesizing an unsymmetrical organic disulfide which comprises subjecting a mixture of an organic disulfide and a mercaptan—the organo-thiyl groups of said reactants being in combination different from that of the reaction products—to a redistribution of their organo-thiyl groups by reacting said mixture at a temperature of from about 50° C. to about 225° C., in the presence of a catalyst chosen from the group consisting of an organic peroxide phenyl disulfides bis-(thiyl-alpha-naphthoyl) disulfide, acetyl disulfide, pentaphenyl ethane and bixanthyl in the amount of from about .05 to about 6 mol per cent based on a reactant, and recovering the unsymmetrical organic disulfide and the mercaptan formed in the process.

6. The method of synthesizing an unsymmetrical organic disulfide which comprises subjecting a mixture of approximately molar equivalent quantities of a symmetrical organic disulfide, RSSR, and a mercaptan, R'SH, wherein R and R' represent two different organic radicals, to a redistribution of their organo-thiyl groups by reacting said mixture at a temperature of from about 50° C. to about 225° C., in the presence of a catalyst chosen from the group consisting of an organic peroxide phenyl disulfides bis-(thiyl-alpha-naphthoyl) disulfide, acetyl disulfide, pentaphenyl ethane and bixanthyl in the amount of from about .05 to about 6 mol per cent based on a reactant, and recovering the unsymmetrical organic disulfide and the mercaptan formed in the process.

7. The method of synthesizing a symmetrical organic disulfide which comprises subjecting a mixture of approximately one mol of an organic disulfide and at least two mols of a mercaptan—the organo-thiyl groups of said reactants being in combination different from that of the reaction products—to a redistribution of their organo-thiyl groups by reacting said mixture at a temperature of from about 50° C. to about 225° C., in the presence of a catalyst chosen from the group consisting of an organic peroxide phenyl disulfides bis-(thiyl-alpha-naphthoyl) disulfide, acetyl disulfide, pentaphenyl ethane and bixanthyl in the amount of from about .05 to about 6 mol per cent based on a reactant, and recovering the symmetrical organic disulfide and the mercaptan formed in the process.

8. The method of synthesizing a symmetrical organic disulfide, R'SSR', which comprises subjecting a mixture of approximately one mol of a symmetrical organic disulfide, RSSR, and at least two mols of a mercaptan, R'SH, wherein R and R' represent two different organic radicals, to a redistribution of their organo-thiyl groups by reacting said mixture at a temperature of from about 50° C. to about 225° C., in the presence of a catalyst chosen from the group consisting of an organic peroxide phenyl disulfides bis-(thiyl-alpha-naphthoyl) disulfide, acetyl disulfide, pentaphenyl ethane and bixanthyl in the amount of from about .05 to about 6 mol per cent based on a reactant, and recovering the symmetrical organic disulfide and the mercaptan formed in the process.

9. The method of synthesizing the symmetrical organic disulfides, RSSR, and R'SSR', which comprises subjecting an unsymmetrical organic disulfide, RSSR', wherein R and R' represent two different organic radicals, to a redistribution of its organo-thiyl groups by reacting said unsymmetrical organic disulfide at a temperature of from about 50° C. to about 225° C., in the presence of a catalyst chosen from the group consisting of an organic peroxide phenyl disulfides bis-(thiyl-alpha-naphthoyl) disulfide, acetyl disulfide, pentaphenyl ethane and bixanthyl in the amount of from about .05 to about 6 mol per cent based on a reactant.

10. The method of synthesizing an unsymmetrical organic disulfide which comprises effecting the redistribution of the organo-thiyl groups within a mixture of organic disulfides—the organo-thiyl groups of said reactants being in combination different from that of the reaction products—by reacting said mixture at a temperature of from about 50° C. to about 150° C., in the presence of an organic peroxide in the amount of from about .05 to about 6 mol per cent based on a reactant.

11. The method of synthesizing an unsymmetrical organic disulfide which comprises effecting the redistribution of the organo-thiyl groups within a mixture of organic disulfides—the organo-thiyl groups of said reactants being in combination different from that of the reaction products—by reacting said mixture at a temperature of from about 50° C. to about 150° C., in the presence of a catalytic amount of an organic peroxide.

MORTON KLEIMAN.

REFERENCES CITED

The following references are of record in the file of this patent:

UNITED STATES PATENTS

| Number | Name | Date |
|---|---|---|
| 1,832,328 | Scott | Nov. 17, 1931 |
| 2,174,248 | Mikeska | Sept. 26, 1939 |
| 2,230,542 | Meinert | Feb. 4, 1941 |
| 2,237,627 | Olin | Apr. 8, 1941 |
| 2,259,861 | Richardson | Oct. 21, 1941 |
| 2,352,435 | Hoeffelman | Jan. 27, 1944 |
| 2,363,614 | Patrick | Nov. 28, 1944 |
| 2,375,083 | Cooper | May 1, 1945 |